(12) United States Patent
Amemura

(10) Patent No.: US 8,725,907 B2
(45) Date of Patent: May 13, 2014

(54) ELECTRONIC DEVICE AND ELECTRONIC DEVICE SYSTEM

(75) Inventor: Tatsuaki Amemura, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 13/569,554

(22) Filed: Aug. 8, 2012

(65) Prior Publication Data

US 2013/0042036 A1 Feb. 14, 2013

(30) Foreign Application Priority Data

Aug. 10, 2011 (JP) ................. 2011-175309

(51) Int. Cl.
*G06F 1/26* (2006.01)
*G06F 13/40* (2006.01)

(52) U.S. Cl.
USPC .............................. 710/8; 713/300

(58) Field of Classification Search
CPC combination set(s) only.
See application file for complete search history.

(56) References Cited

U.S. PATENT DOCUMENTS

| 2003/0172312 | A1 | 9/2003 | Takahashi et al. | |
|---|---|---|---|---|
| 2011/0208980 | A1* | 8/2011 | Brooks et al. | 713/300 |
| 2011/0271122 | A1* | 11/2011 | King | 713/300 |

FOREIGN PATENT DOCUMENTS

| JP | 2003-263245 A | 9/2003 |
|---|---|---|
| JP | 3151486 U | 6/2009 |
| JP | 2011-031031 | 2/2011 |
| JP | 2011-203781 A | 10/2011 |

* cited by examiner

*Primary Examiner* — Ilwoo Park
(74) *Attorney, Agent, or Firm* — Edwards Wildman Palmer LLP; David G. Conlin; Edmund J. Koundakjian

(57) ABSTRACT

An electronic device includes a USB connector, a power supply unit for supplying electric power to an external device, which is connected via the USB connector, a judgment unit for judging whether the external device is a device being compliant with a USB 2.0 standard or a compatible device being compatible with a device complying with the USB 2.0 standard; and an acquisition unit for acquiring a value of voltage requested by a connected compatible device by communicating with the connected compatible device when the judgment unit judges that the external device is the compatible device; wherein the power supply unit supplies electric power corresponding to the value of voltage acquired by the acquisition unit to the compatible device when the judgment unit judges that the external device is the compatible device.

2 Claims, 3 Drawing Sheets

ELECTRONIC DEVICE AND ELECTRONIC DEVICE SYSTEM

CROSS-REFERENCE TO RELATED APPLICATIONS

This Nonprovisional application claims priority under 35 U.S.C.§119(a) on Patent Application No. 2011-175309 filed in Japan on Aug. 10, 2011, the entire contents of which are hereby incorporated by reference.

FIELD

The present invention relates to an electronic device provided with a USB connector and to an electronic device system provided with the electronic device.

BACKGROUND

Some electronic devices such as a notebook-sized personal computer or a tablet-type portable terminal are provided with a USB (Universal Serial Bus) interface, and it is possible to add functions to such an electronic device by connecting the electronic device with an external device, which is also provided with a USB interface. Such an external device may be selected from various devices including a printing device such as a printer, an imaging device such as a digital camera, a storage device such as a USB flash drive, a communication device such as a wireless LAN, and the like.

Regarding a USB, a USB standard specifies a power supply method to an external device in addition to a data transfer method. Accordingly, a USB provides the advantage that it is possible to supply electric power from an electronic device via a USB interface to an external device when the external device is not provided with any power source, and there is no need to separately prepare a power source as long as the external device is a low-power-consumption device such as a USB flash drive. A standard for a USB interface is, for example, the USB 2.0 standard or the USB 3.0 standard (see Japanese Registered Utility Model No. 3151486).

However, a USB standard limits a specification of current (electric power) available from an electronic device and therefore it is impossible to use an external device solely when an external device which needs current (electric power) exceeding the specification is connected with a USB interface of an electronic device for use. In such a case, there is a need to separately prepare a power source to supply necessary electric power to an external device.

Moreover, although a standard is extended from the USB 2.0 standard to the USB 3.0 standard and a specification of current is increased from 500 mA to 900 mA, there is still a need to separately prepare a power source when an external device which needs high electric power, such as a display, is used.

SUMMARY

The present application has been made in view of such a situation, and the object thereof is to provide an electronic device, which can increase available electric power while being compliant with a USB standard, and an electronic device system provided with the electronic device.

An electronic device disclosed in the present application includes a USB connector, a power supply unit for supplying electric power to an external device, which is connected via the USB connector, a judgment unit for judging whether the external device is a device being compliant with a USB 2.0 standard or a compatible device being compatible with a device complying with the USB 2.0 standard, and an acquisition unit for acquiring a value of voltage requested by a connected compatible device by communicating with the connected compatible device when the judgment unit judges that the external device is a compatible device, wherein the power supply unit supplies electric power corresponding to the value of voltage acquired by the acquisition unit to the compatible device when the judgment unit judges that the external device is the compatible device.

The electronic device disclosed in the present application, wherein the USB connector is a connector for a USB 3.0 interface including first through ninth terminals, and the judgment unit judges an external device connected with the USB connector, using at most four terminals among five terminals of fifth through ninth terminals.

The electronic device disclosed in the present application, wherein the judgment unit judges that the external device is the compatible device when communication with the external device is established in at most four terminals among the five terminals of the fifth through ninth terminals.

The electronic device disclosed in the present application, wherein the power supply unit supplies electric power via at least one terminal among the five terminals of fifth the through ninth terminals, other than terminals used for judgment of the external device.

An electronic device system disclosed in the present application includes the electronic device described above and any one of a device being compliant with a USB 2.0 standard and a compatible device being compatible with a device complying with the USB 2.0 standard.

An electronic device according to the present invention is provided with: a power supply unit for supplying electric power to an external device which is connected via a USB connector; and a judgment unit for judging whether the external device is a USB 2.0 device or a USB compatible device. The USB connector is, for example, a USB connector of the USB 3.0 standard and has nine terminals: a terminal 1 through a terminal 9. External devices to be connected with the USB connector are divided into two types: a USB 2.0 device being compliant with the USB 2.0 standard (a device having a specification of current being compliant with the USB 2.0 standard), and a compatible device being compatible with a device complying with the USB 2.0 standard (a device having a specification of current exceeding the USB 2.0 standard).

The judgment unit judges that a compatible device has been connected when communication can be established. The fifth and sixth terminals of the compatible device, for example, are allocated to an interface for communication in advance. When a compatible device is connected with a USB connector, communication is started using the fifth and sixth terminals, which are not used for a USB 2.0 device, and therefore establishment of communication is detected and it is judged that a compatible device has been connected.

Moreover, when communication with a compatible device is established, a voltage level requested by the compatible device is acquired via communication.

When the judgment unit judges that an external device is a compatible device, the power supply unit supplies a plurality of electric powers to the compatible device. The terminals other than terminals 1-4 having a function set for a USB 2.0 can be used for supplying electric power to the compatible device. This allows the electronic device to carry out data transfer and power supply being compliant with the USB 2.0 standard when a USB 2.0 device is connected, and to supply electric power requested by a compatible device from the power supply unit when a compatible device is connected.

Accordingly, the present invention makes it possible to increase electric power available to a compatible device while being compliant with a USB standard.

The above and further objects and features of the invention will more fully be apparent from the following detailed description with accompanying drawings.

DESCRIPTION OF EMBODIMENTS

The following description will explain the present invention in concrete terms with reference to the drawings illustrating an embodiment thereof.

Figure 1:
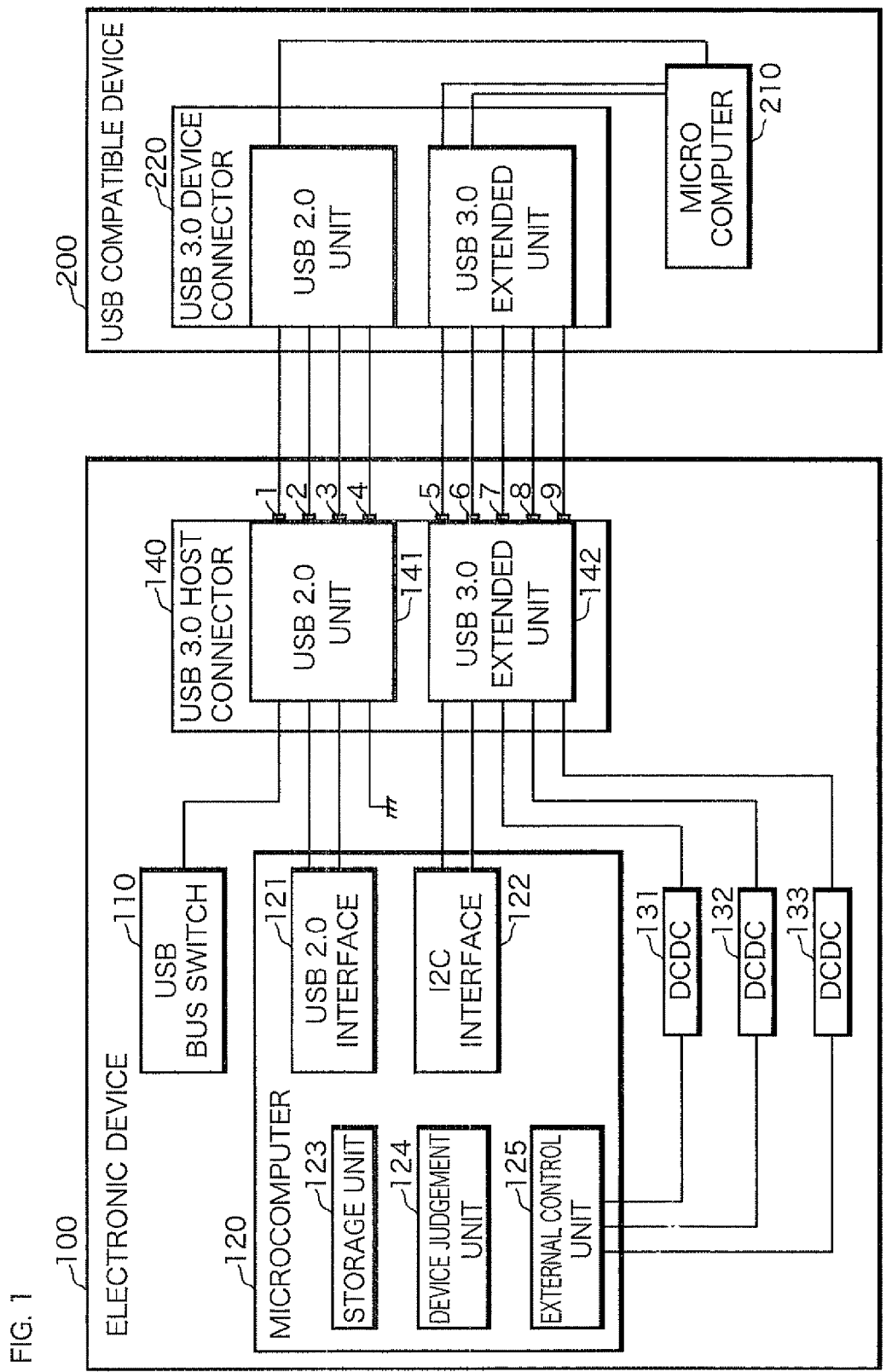
FIG. 1 is a block diagram illustrating an example of an electronic device system according to the present embodiment.
Figure 2:
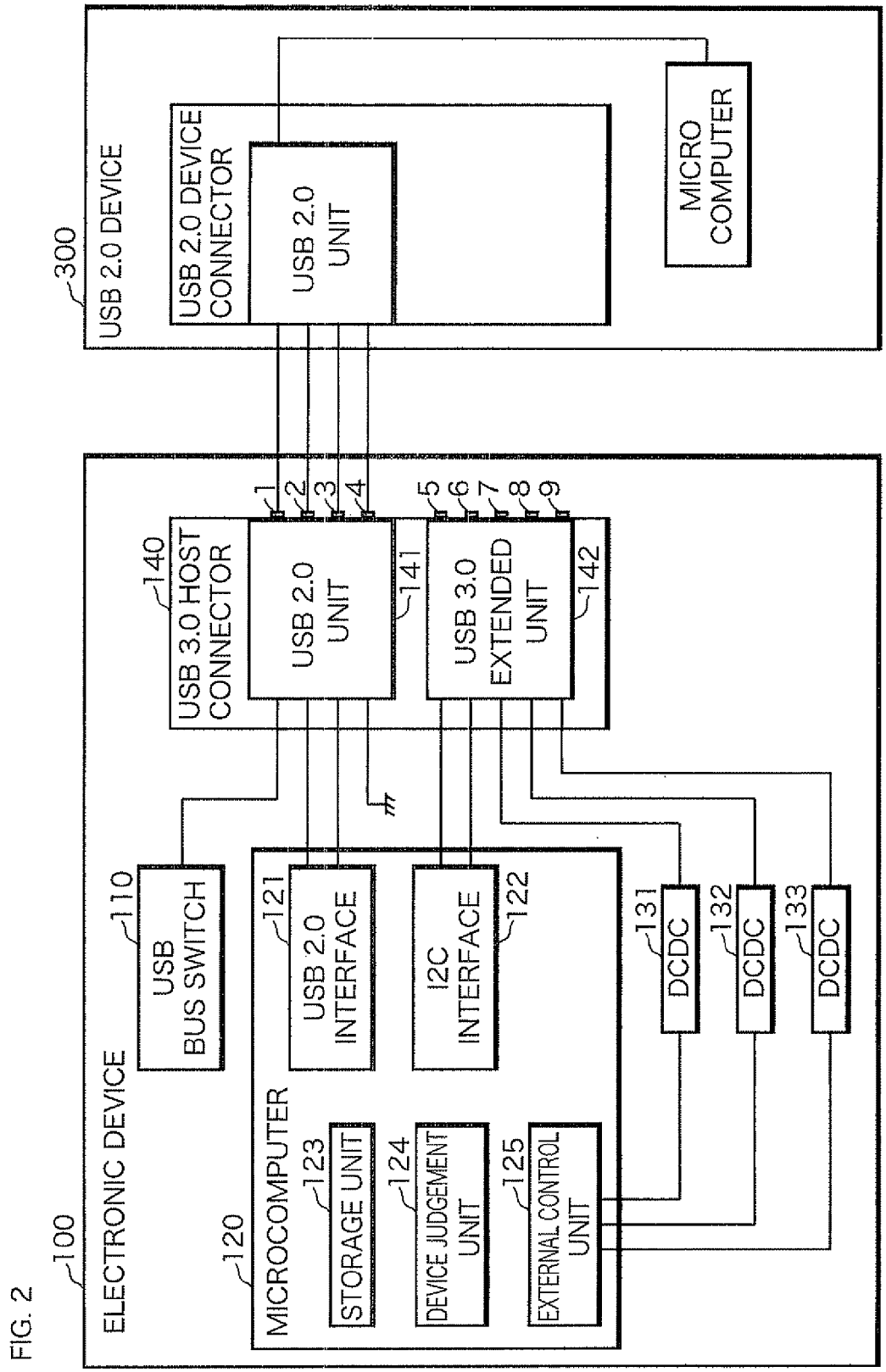
FIG. 2 is a block diagram illustrating an example of an electronic device system according to the present embodiment.

FIGS. 1 and 2 are block diagrams illustrating examples of an electronic device system according to the present embodiment. An electronic device system according to the present embodiment is provided with an electronic device 100 and a USB device, which is connected with the electronic device 100 via a USB connector. FIG. 1 illustrates an example wherein a USB compatible device 200 (an external device) is connected with the electronic device 100, and FIG. 2 illustrates an example wherein a USB 2.0 device 300 (an external device) is connected with the electronic device 100.

The electronic device 100 and the USB compatible device 200 are connected with each other via a USB connector having a connector shape being compliant with the USB 3.0 standard including terminals 1 through 9 (first through ninth terminals), for example. It is to be noted that the electronic device 100 and the USB 2.0 device 300 are connected with each other via four terminals 1 through 4 among terminals 1 through 9 of the USB connector.

It is to be noted that the USB 2.0 device 300 in the following explanation is a device, which can carry out data transfer being compliant with the USB 2.0 standard and operates below a current specification (500 mA) specified by the USB 2.0 standard.

The USB compatible device 200 is a device, which can carry out data transfer being compliant with the USB 2.0 standard and requires current exceeding a current specification (500 mA) specified by the USB 2.0 standard or voltage other than a voltage specification (5 V) (a device being compatible with a device complying with the USB 2.0 standard).

The electronic device 100 is provided with a USB bus switch 110, a microcomputer 120, DC-DC converters 131-133, a USB 3.0 host connector (a USB connector) 140 and the like.

The microcomputer 120 is constituted of an integrated circuit for controlling the electronic device 100 and is provided with a USB 2.0 interface 121, an I2C (Inter-Integrated Circuit) interface 122, a storage unit 123, a device judgment unit 124, an external control terminal 125 and the like. It is to be noted that the I2C interface 122 may be substituted by another interface, which can communicate using four or fewer signal lines, such as an SPI (Serial Peripheral Interface).

The USB compatible device 200 is a device being compatible with a device complying with the USB 2.0 standard and is provided with a microcomputer 210, a USB 3.0 device connector (a USB connector) 220 and the like. It is to be noted that the structure of the USB compatible device 200 for carrying out functions thereof is omitted here for simplicity.

The USB 3.0 host connector 140 of the electronic device 100 is a USB connector provided with terminals 1 through 9. Terminals 1 through 4 compose a USB 2.0 unit 141, and terminals 5 through 9 compose a USB 3.0 extended unit 142. The USB 3.0 device connector 220 of the USB compatible device 200 has a structure similar to the USB 3.0 host connector 140.

The USB 3.0 host connector 140 and the USB 3.0 device connector 220 are connected with each other via cables, for example.

When the USB 2.0 device 300 is connected with the electronic device 100, the electronic device 100 uses the terminals 1 through 4 for data transfer and power supply being compliant with the USB 2.0 standard. On the other hand, when the USB compatible device 200 is connected with the electronic device 100, the electronic device 100 uses the terminals 1 through 9 for data transfer being compliant with the USB 2.0 standard and supply of current and voltage (electric power) exceeding specifications of the USB 2.0 standard.

When the USB compatible device 200 is connected, the DC-DC converters 131-133 can supply current and voltage (electric power) exceeding specifications of the USB 2.0 standard to the USB compatible device 200 via terminals 7 through 9, for example, under control of the microcomputer 120.

The present invention is not necessarily limited to the structure of the present embodiment wherein the I2C interface 122 connected with the terminals 5 and 6 of the USB 3.0 host connector 140 is used for connection judgment of an external device so that electric power is supplied via the terminals 7-9. For example, the present invention may have a structure wherein one or two terminals among the terminals 7-9 are used for power supply. Moreover, when an SPI which uses four signal lines for communication is used for connection judgment of an external device, four terminals 5-9, for example, are occupied, so that the present invention may have a structure wherein the other one terminal is used for power supply.

The device judgment unit 124 judges whether the I2C interface 122 of the microcomputer 120 has established communication or not. When communication is started, the device judgment unit 124 judges that a USB compatible device 200 has been connected.

When the USB 2.0 device 300 is connected, the terminals 1 through 4 are used, so that the terminals 5 through 9 are not connected, in other words, are in the open state. When the USB 2.0 device 300 is connected, communication via the terminals 5 and 6 is not started, so that it is possible to judge that an external device is the USB 2.0 device 300. When the USB compatible device 200 is connected, communication is started, so that it is possible to judge that an external device is the USB compatible device 200.

When the USB compatible device 200 is connected, the microcomputer 120 starts communication with the USB compatible device 200 via the I2C interface 122 and acquires a voltage level requested by the USB compatible device 200. The microcomputer 120 stores the voltage level requested by the USB compatible device 200, which has been acquired via communication, in the storage unit 123.

The microcomputer 120 gives an instruction to start necessary operations of the DC-DC converters 131-133 via the external control terminal 125 on the basis of the voltage level stored in the storage unit 123. For example, the microcomputer 120 compares the stored voltage level with two preset thresholds, and carries out control to cause only one of the DC-DC converters 131-133 to operate when the stored voltage level is low, to cause two of the DC-DC converters 131-133 to operate when the stored voltage level is middle, and to cause all of the DC-DC converters 131-133 to operate when the stored voltage level is high.

The present invention is not limited to the structure of the example illustrated in FIG. 1 wherein the microcomputer 120 is mounted as a component having a USB host controller. The present invention can also be applied even when an SOC (System On a Chip), a southbridge chipset or the like is mounted as a component having a USB host controller.

Figure 3:
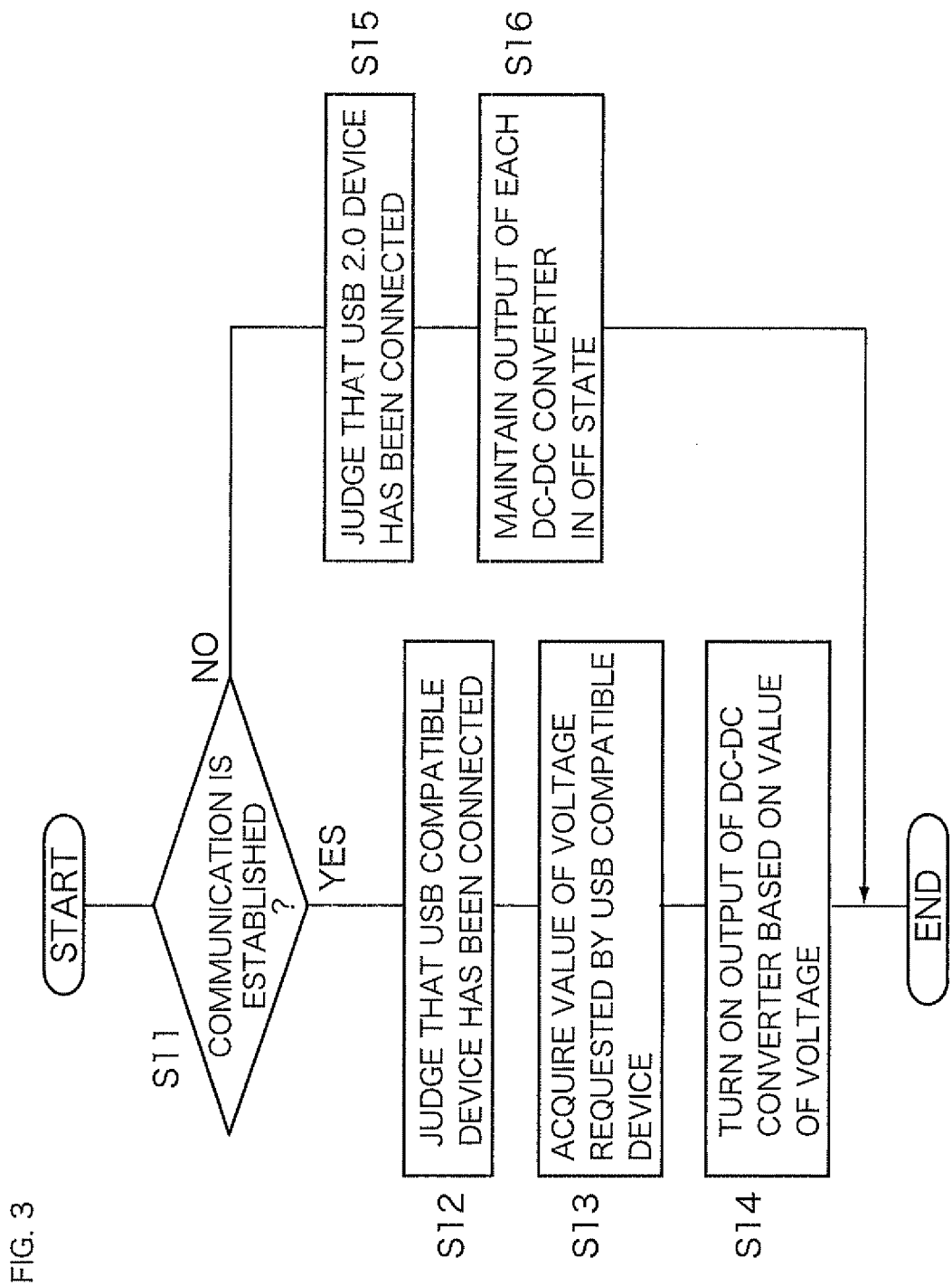
FIG. 3 is a flow chart illustrating the process procedure of an electronic device according to the present embodiment.

FIG. 3 is a flow chart illustrating the process procedure of the electronic device 100 according to the present embodiment. The following description will explain the microcomputer 120 as a main unit for processing. The microcomputer 120 judges whether communication is established in the I2C interface 122 (terminals 5 and 6) or not (S11).

When communication is established (S11: YES), the microcomputer 120 judges that a USB compatible device 200 has been connected (S12), acquires a value of voltage requested by the USB compatible device 200 via communication (S13) and stores the acquired value of voltage in the storage unit 123.

The microcomputer 120 then turns on the output of necessary DC-DC converter(s) 131-133 on the basis of the value of voltage stored in the storage unit 123 (S14) and terminates the processing.

On the other hand, when communication is not established (S11: NO), the microcomputer 120 judges that a USB 2.0 device 300 has been connected (S15), maintains the output of each DC-DC converter in the off state (S16) and terminates the processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic device comprising:
   a USB connector comprising a USB 2.0 connector part including a first through fourth terminals with is compliant with a USB 2.0 standard, and an extended connector part for a compatible device including fifth through ninth terminals;
   a power supply unit for supplying electric power to an external device, which is connected via the USB connector;
   a judgment unit for judging whether the external device is a device being compliant with a USB 2.0 standard or a compatible device being compatible with a device complying with the USB 2.0 standard, wherein the judgment unit judges an external device connected with the USB connector, using at most four terminals among five terminals of the fifth through ninth terminals; and
   an acquisition unit for acquiring a value of voltage requested by a connected compatible device by communicating with the connected compatible device when the judgment unit judges that the external device is the compatible device; wherein
   the power supply unit supplies electric power corresponding to the value of voltage acquired by the acquisition unit to the compatible device when the judgment unit judges that the external device is the compatible device, wherein the power supply unit supplies electric power via at least one terminal among the five terminals other than terminals used for judgment of the external device.

2. An electronic device system comprising:
   the electronic device according to claim 1; and
   any one of a device being compliant with a USB 2.0 standard and a compatible device being compatible with a device complying with the USB 2.0 standard.

* * * * *